(12) United States Patent
Cabbage et al.

(10) Patent No.: US 11,433,324 B2
(45) Date of Patent: Sep. 6, 2022

(54) WATER FILTRATION METHODS AND SYSTEMS

(71) Applicant: VivoBlu Inc, Greenwood Village, CO (US)

(72) Inventors: Roger Cabbage, Broomfield, CO (US); Robert Milton Miller, Golden, CO (US)

(73) Assignee: VivoBlu Inc, Greenwood Village, CO (US)

( * ) Notice: Subject to any disclaimer, the term of this patent is extended or adjusted under 35 U.S.C. 154(b) by 0 days.

(21) Appl. No.: 16/801,058

(22) Filed: Feb. 25, 2020

(65) Prior Publication Data

US 2020/0269162 A1 Aug. 27, 2020

Related U.S. Application Data

(60) Provisional application No. 62/810,279, filed on Feb. 25, 2019.

(51) Int. Cl.
*B01D 35/02* (2006.01)
*B01D 24/00* (2006.01)
*B01D 35/027* (2006.01)

(52) U.S. Cl.
CPC ............. *B01D 23/20* (2013.01); *B01D 23/26* (2013.01); *B01D 35/0273* (2013.01)

(58) Field of Classification Search
CPC .... B01D 23/20; B01D 35/0273; B01D 23/26; B01D 29/15; C02F 2303/16; C02F 1/44
See application file for complete search history.

(56) References Cited

U.S. PATENT DOCUMENTS

| 4,218,324 A | 8/1980 | Hartmann et al. |
| 4,462,916 A | 7/1984 | Ecabert et al. |
| 4,491,520 A | 1/1985 | Jaye |

(Continued)

FOREIGN PATENT DOCUMENTS

| CN | ZL 202130369201X | 11/2021 |
| CN | ZL 2021303689924 | 11/2021 |

(Continued)

OTHER PUBLICATIONS

International Search Report and Written Opinion on International PCT Application No. PCT/US2020/19750, dated Jun. 23, 2020, 9 pages.

(Continued)

*Primary Examiner* — Waqaas Ali
(74) *Attorney, Agent, or Firm* — King IAM LLC

(57) ABSTRACT

The disclosed technology includes systems and methods for water filtration. In one implementation, a system includes a water receptacle to house unfiltered water, the receptacle including an aperture located in a sidewall, a valve component located on an exterior surface of the sidewall in alignment with a filter housing located on an interior surface of the sidewall filtrate the unfiltered water. In one implementation, a method includes filling a water receptacle with unfiltered water, filtrating the unfiltered water through a filter housing in the water receptacle to obtain filtered water, (Continued)

and moving the filtered water from the filter housing and out of a valve component connected to a first end of a filter housing.

17 Claims, 6 Drawing Sheets

(56) References Cited

U.S. PATENT DOCUMENTS

| | | | |
|---|---|---|---|
| 5,066,393 | A | 11/1991 | Padera et al. |
| 5,536,396 | A | 7/1996 | Mudra et al. |
| 5,562,824 | A | 10/1996 | Magnusson |
| 5,591,332 | A | 1/1997 | Reid et al. |
| 6,048,456 | A | 4/2000 | Palmer |
| 7,575,678 | B2 | 8/2009 | Kuo |
| 9,630,856 | B2 | 4/2017 | Loniewski et al. |
| 9,796,600 | B2 | 10/2017 | Shotey et al. |
| 10,196,282 | B2 * | 2/2019 | Boudreau ............... C02F 1/003 |
| 2002/0036176 | A1 | 3/2002 | Hughes et al. |
| 2003/0196944 | A1 | 10/2003 | Tanner et al. |
| 2006/0144781 | A1 | 7/2006 | Carlson et al. |
| 2007/0181487 | A1 | 8/2007 | Henderson |
| 2010/0300989 | A1 | 12/2010 | Baumann et al. |
| 2012/0091070 | A1 | 4/2012 | Sjauta et al. |
| 2012/0187052 | A1 | 7/2012 | Elliott |
| 2013/0055794 | A1 | 3/2013 | Armour |
| 2013/0233890 | A1 * | 9/2013 | Melzer ................... C02F 1/003 222/189.06 |
| 2018/0016158 | A1 | 1/2018 | McDonald et al. |

FOREIGN PATENT DOCUMENTS

| | | | |
|---|---|---|---|
| CN | ZL-2021303689939 | 11/2021 | |
| CN | ZL 2021303691835 | 11/2021 | |
| CN | ZL 2021303692077 | 11/2021 | |
| CN | 113784773 A | 12/2021 | |
| CN | ZL-2021304290061 | 12/2021 | |
| GB | 2501822 A * | 11/2013 | ............... C02F 1/44 |
| WO | WO-2020-176541 A1 | 9/2020 | |

OTHER PUBLICATIONS

International Preliminary Report on Patentability, International PCT Application No. PCT/US2020/19750, dated Aug. 25, 2021, 9 pages.
Notification of Grant, Chinese Application No. 202130369201X, dated Aug. 31, 2021, 2 pages.
Notification of Grant, Chinese Application No. 2021303689924, dated Aug. 31, 2021, 2 pages.
Notification of Grant, Chinese Application No. 2021303691835, dated Sep. 3, 2021, 2 pages.
Notification of Grant, Chinese Application No. 2021303692077, dated Sep. 3, 2021, 2 pages.
Notification of Grant, Chinese Application No. 2021303689939, dated Sep. 18, 2021, 2 pages.
Notification of Grant, Chinese Application No. 2021304290061, dated Sep. 23, 2021, 2 pages.

* cited by examiner

WATER FILTRATION METHODS AND SYSTEMS

CROSS-REFERENCE TO RELATED APPLICATION

This application claims the benefit of U.S. Provisional patent application No. 62/810,279, entitled "WATER FILTRATION METHODS AND SYSTEMS," filed on Feb. 25, 2019, and is specifically incorporated by reference for all it discloses and teaches.

BACKGROUND

In water filtration processes, contaminants in water may be removed by a physical separation method. The mixture of water and suspended contaminants may be transported by gravity force or a pumping force through a porous filtration barrier.

SUMMARY

The disclosed technology includes systems and methods for water filtration. In one implementation, a water filtration system may include a water receptacle to house unfiltered water, the water receptacle including an aperture located in a wall (e.g. a side wall) of the water receptacle, a valve, the valve including a valve arm to control water flow, the valve and the valve arm located on an exterior surface of the sidewall of the water receptacle, and a filter housing to filtrate the unfiltered water, the filter housing located on an interior surface of the sidewall of the water receptacle and in alignment with the valve, a first end of the filter housing connected to the valve via the aperture of the water receptacle, and a second end of the filter housing connected to porous tubes to collect pathogens. In some embodiments, a removable sleeve attaches to the second end of the filter housing and encloses the porous tubes. The removable sleeve may be removed for access to the porous tubes for cleaning. The porous tubes may be clean in unfiltered water.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. These and various other features and advantages will be apparent from a reading of the following Detailed Descriptions.

BRIEF DESCRIPTIONS OF THE DRAWINGS

DETAILED DESCRIPTIONS

Figure 1:
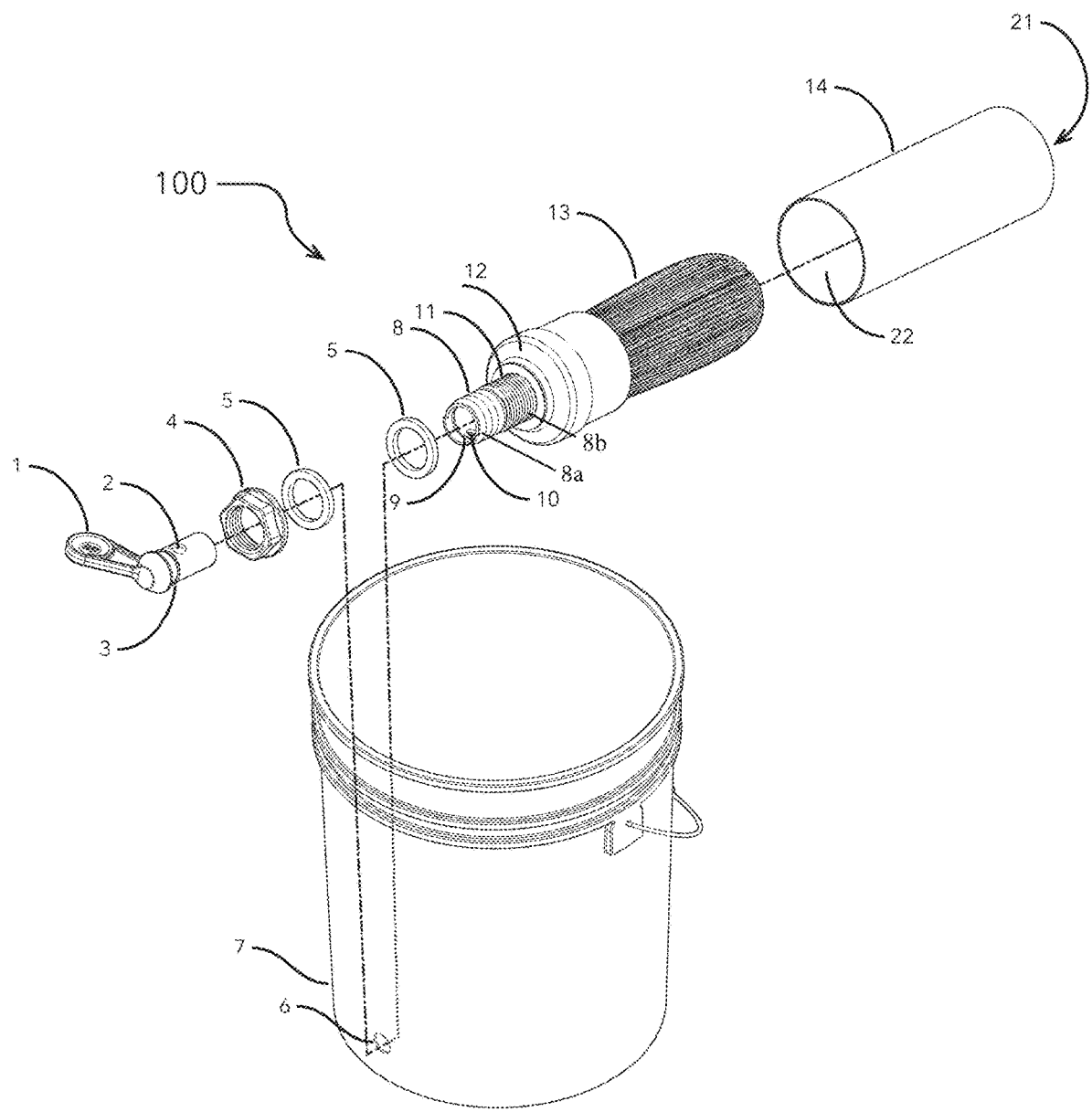
FIG. 1 illustrates a schematic diagram of an example water filtration system in a first embodiment.

The system and methods discussed herein include a durable water filtration system that uses minimal materials and may be adapted to a variety of water vessels. In some implementations, porous tubes (e.g., 0.1 µm absolute, 0.2 µm absolute) in the water filtration system may be used to filtrate the water. The system may include water flow control with a valve component. The water filtration may be facilitated by gravity or other means. In some implementations, pumps may be used as a means for cleaning the porous tubes.

In some implementations, the system includes a water receptacle to house unfiltered water, the water receptacle including an aperture located in a wall (e.g. a side wall) of the water receptacle, a valve, the valve including a valve arm to control water flow, the valve and the valve arm located on an exterior surface of the sidewall of the water receptacle, and a filter housing to filtrate the unfiltered water, the filter housing located on an interior surface of the sidewall of the water receptacle and in alignment (e.g., horizontal alignment) with the valve, a first end of the filter housing connected to the valve via the aperture of the water receptacle, and a second end of the filter housing connected to porous tubes to collect pathogens. In some implementations, a removable filter sleeve is configured to connect to the filter housing to encase the porous tubes and to disconnect from the filter housing to provide access for cleaning the porous tubes. The removable sleeve protects the porous tubes. In some cases, the removable filter sleeve encases the porous tubes, where it surrounds the tubes, but there is at least one aperture or slot on the filter sleeve to allow water to enter the sleeve and enter the porous tubes to move through the filter housing and out to the valve to exit the water filtration system.

In some implementations, the porous tubes are hollow fibers (e.g., synthetic material). In some implementations, the porous tubes are potted into the filter housing. In some implementations, the porous tubes are encased by nylon netting.

In some implementations, a hand pump is assembled between the valve and the filter housing, the hand pump may be located on the exterior surface of the sidewall of the water receptacle, and the hand pump may be configured to compress for pumping water from an outside water supply into the water receptacle in a backwash process to clean the porous tubes. In some implementations, a spigot may be attached to the filter housing.

The disclosed water filtration system may be used in underdeveloped regions of the world to provide filtered water originating from rivers, lakes, streams, deep or shallow wells, taps, or other various water sources. The disclosed water filtration system may be cleaned by a user with one hand by removing the filter sleeve from the filter housing and cleaning the porous tubes. The porous tubes may be cleaned by washing, moving, massaging, swirling, or agitating the porous tubes. In some embodiments, the water filtration system filters a "contaminant" from the water. For purposes of this disclosure, a contaminant may include contaminants, debris, pathogens, bacteria, parasites, microorganisms, elements, or other foreign substances that a user would want filtered out of water. In some embodiments, the water filtration system will filter out viruses.

The disclosed invention allows for cleaning the porous tubes in unfiltered water. For example, in some embodiments, a user can remove the filter sleeve and clean the porous tubes in the original unfiltered water in the water receptacle 7. In another example, the user can empty the water receptacle 7, add new unfiltered water, and the filling of the water receptacle 7 with the new unfiltered water can agitate, and thereby clean, the porous tubes. Backwashing may not be required in the water filtration system.

FIG. 1 illustrates a schematic diagram of an example water filtration system 100 in a first embodiment. The water filtration system 100 in FIG. 1 is shown unassembled and includes a filter housing 12 with a removable filter sleeve 14 that is connected to a valve component (e.g. valve component 17 shown in FIGS. 2, 4, and 5) in a water receptacle 7.

The water receptacle 7 may be a various apparatus. For example, the water receptacle 7 may be a bucket, a can, a drum, or a jug, or a larger system, apparatus, vessels with multiple filters or filter, or portable vessels. In other examples, the water receptacle may be a water bottle. The filter housing 12 and the valve component 17 may be connected to each other with a nut 4 and two washers 5, and other similar connection components are contemplated. In some implementations, the washers 5 and a nut 4 pass over the valve arm 1 and filter housing's valve receiver 8 comprising a first receiver end 8a and a second receiver end 8b to create a seal to the water receptacle 7. Thus, there may be a washer on each side of a wall of the water receptacle 7.

The filter housing 12 is shown with a first bead 9 that locks in the valve receiver 8. On a first end of the filter housing 12, a filter housing opening 10 and threads 11 are shown. On a second end of the filter housing 12, porous tubes 13 are shown. The porous tubes 13 provide filtration of unfiltered water in the water receptacle 7.

Figure 6:
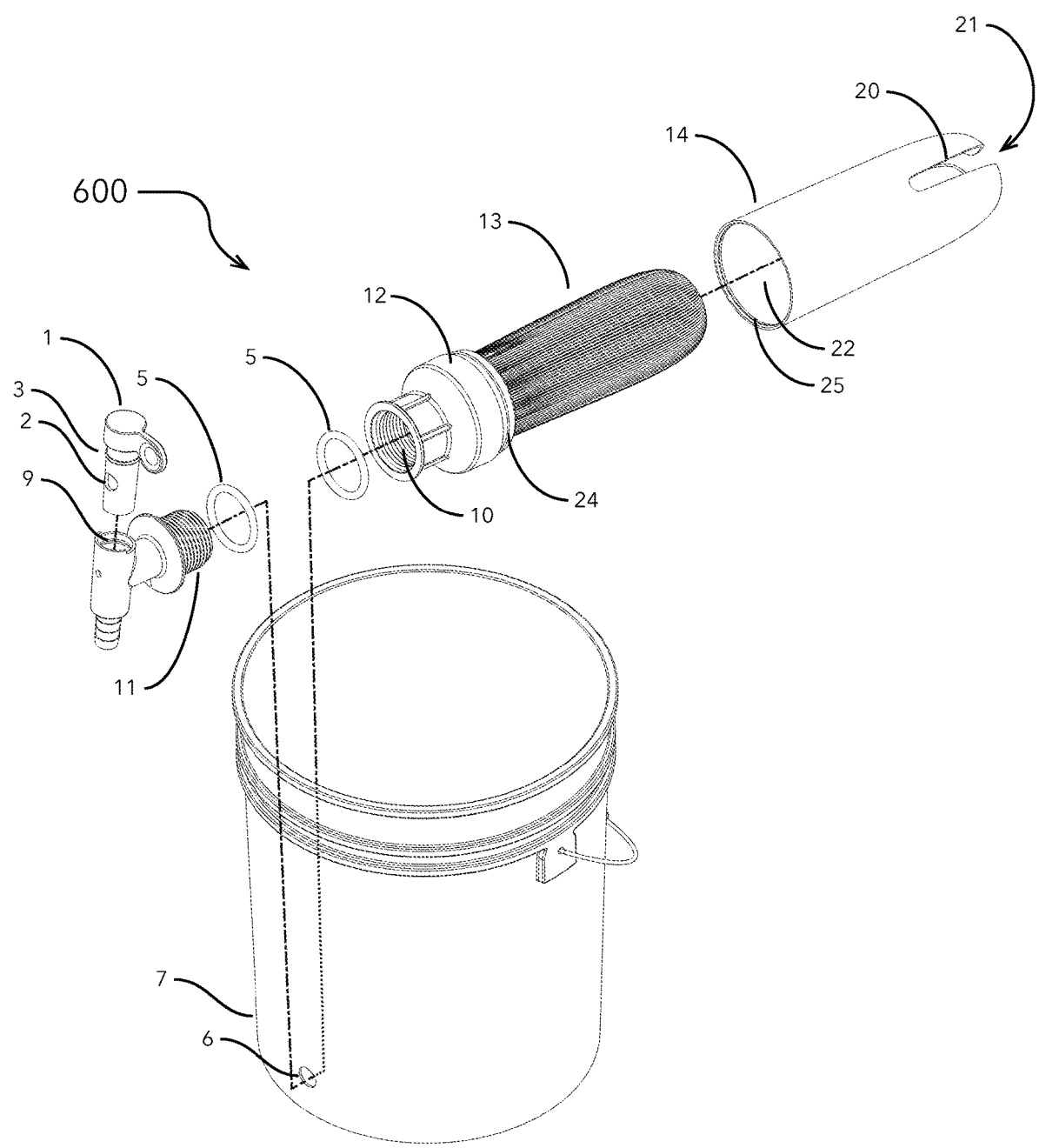
FIG. 6 illustrates a schematic diagram of an example water filtration system in a fifth embodiment.

Due to the density of the porous tubes 13, dirt, debris, and organic material collect among the porous tubes 13. The filter sleeve 14 encases and protects the porous tubes 13 from incidental damage and reduces contact with sediment in the water vessel 7. The filter sleeve 14 may slide onto the filter housing 12, or it may attach by other means, such as by a twist, screw on, or bead/female bead attaching means. For example, in FIG. 1, the filter sleeve 14 slides onto the filter housing 12. In FIG. 6, described below, the filter sleeve 14 slides on and then attaches and locks by a second bead 24 and a second female bead 25. As the filter sleeve 14 slides onto the filter housing 12, the porous tubes 13 enter a first sleeve aperture 22 on one end of the filter sleeve 14. A second sleeve aperture 21 is located at the opposite end of the filter sleeve, where water can enter the filter sleeve 14.

FIG. 1, the filter sleeve 14 is a tubular component with a round first sleeve aperture 22 and a round second sleeve aperture 21. In FIG. 6 (described below), the filter sleeve 14 is a tubular component with a round first sleeve aperture 22 at a first end, and a rounded second end, decreasing slightly in diameter with a second aperture 21 shaped according to slots 20 in the filter sleeve 14. The slots 20 provide for more water flow into the filter sleeve 14. In other embodiments, shape of the filter sleeve 14, the apertures, and the slots may vary.

The filter sleeve 14 can be removed to allow more efficient cleaning and maintenance by methods such as rinsing, back-washing, swirling, manually massaging debris out by hand. However, in some implementations, there is no removable filter sleeve 14 in the water filtration system 100.

During cleaning, the filter housing 12 may be disconnected from the valve component 17 and the porous tubes can be swirled around in water or massaging to remove bacteria, dirt, pathogens, etc. In some implementations, the filter housing 12 is not removed and the porous tubes may be massaged in water while the filter housing is connected to the valve component 17. The water may be the unfiltered water in the water receptacle, or new unfiltered water introduced into the water receptacle. In such implementations, backwashing may not be required.

The valve component 17 may include a variety of component parts. For example, as shown in FIG. 1, the valve component 17 includes a valve arm 1, a first bead 3, and a valve opening 2, where water can flow in and out. In other implementations, as discussed below, the valve component may include a spigot, a ball valve, or other component. The valve arm 1 in FIG. 1 controls the flow of water in and out of the valve component 17. To reduce parts in the water filtration system 100, the first 3 in FIG. 1 locks directly into a filter housing's 12 valve receiver 8 so that the valve's opening 2 can be rotated parallel to the ground to align with the filter housing's opening 10 to allow water to flow.

The valve component 17 is positioned on an exterior surface of a sidewall of the water receptacle 7, while the filter housing 12 is positioned an interior surface of the sidewall of the water receptacle 7. The connection between the valve component 17 and the filter housing 12 may be positioned on either side of the sidewall, or inside the sidewall of the water receptacle 7. The connection between the valve component 17 and the filter housing 12 may be positioned in an aperture 6, or outside of the aperture 6.

The valve component 17 and the filter housing 12 may be positioned together in a horizontal axis. The water may be moved by gravity through either the valve component 17 or the filter housing 12, depending on whether the system 100 is being used for water filtration or cleaned by way of backwashing from an exterior water supply to the valve component 17 and through the filter housing 12 and out the porous tubes 13. Other means for moving the water through the water filtration system 100 other than gravity is contemplated. For example, as discussed in FIG. 5, a hand pump may be used to help facilitate water movement during a cleaning process. In another example, there may be a mechanical system attached to the valve component 17 or filter housing 17.

Figure 2:
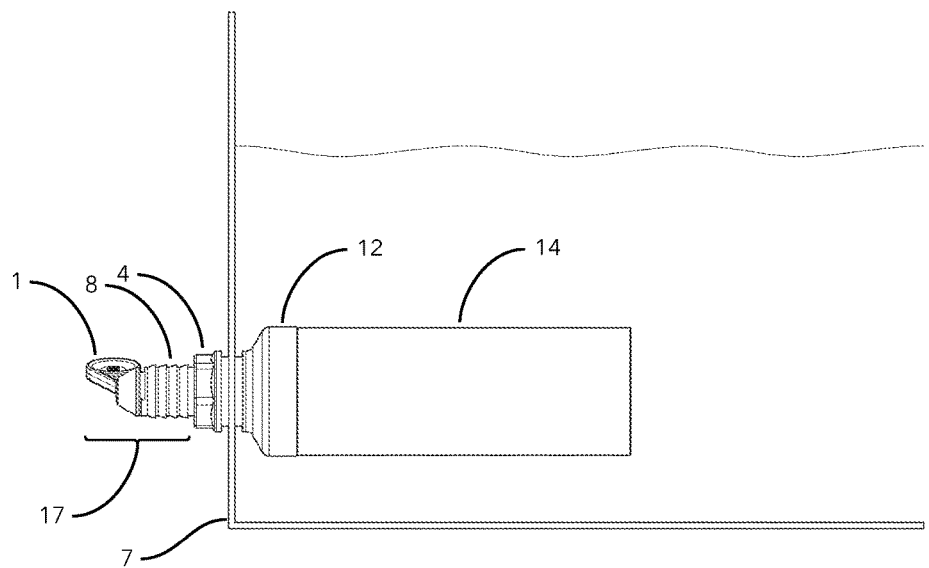
FIG. 2 illustrates a schematic diagram of an example water filtration system in a first embodiment.

FIG. 2 illustrates a schematic diagram of an example water filtration system 200 in the first embodiment. In FIG. 2, the water filtration system 300 in the first embodiment is shown assembled with a removable shell 14 encasing the porous tubes (not shown) on the filter housing 12 in the water receptacle 7. The valve component 17 is shown with a valve arm 1, valve receiver 8, and nut 4.

Figure 3:
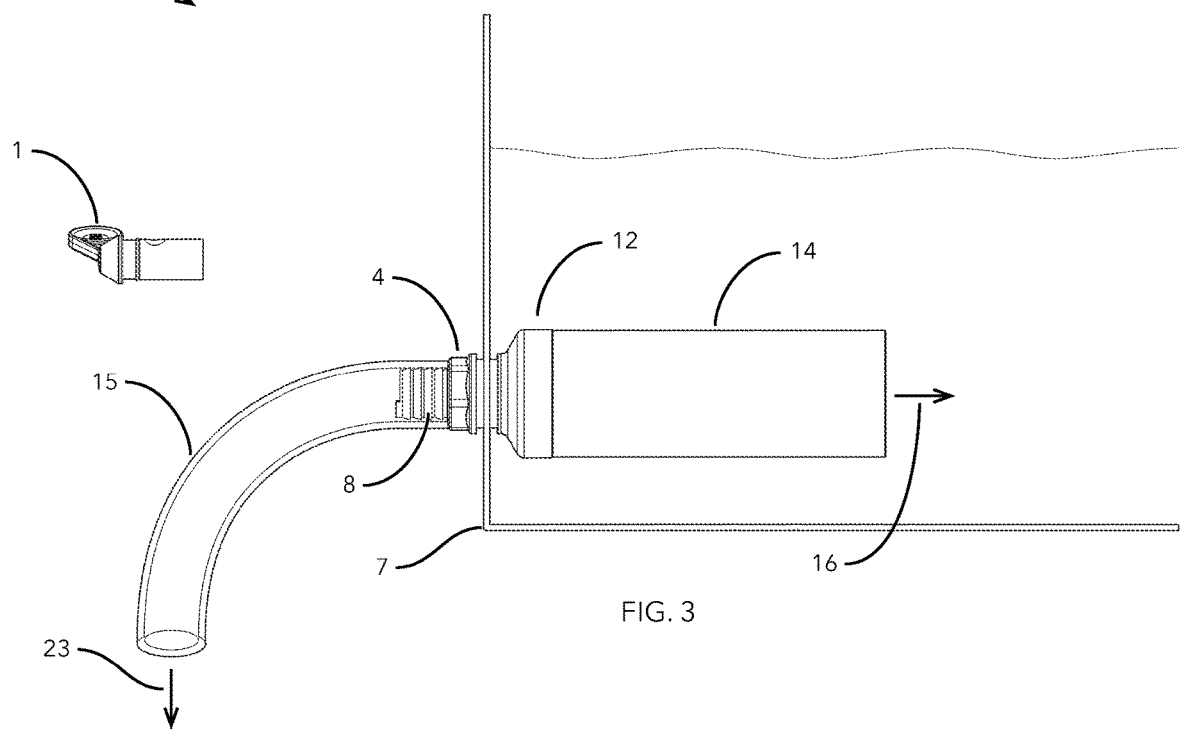
FIG. 3 illustrates a schematic diagram of an example water filtration system in a second embodiment.

FIG. 3 illustrates a schematic diagram of an example water filtration system 300 in a second embodiment. In FIG. 3, the water filtration system 300 in the second embodiment is shown assembled with a removable shell encasing the porous tubes (not shown) on the filter housing 12, and a hose 15 attached to the valve receiver 8 of the filter housing 12.

In some embodiments, arrow 23 depicts that water can move from the filter housing 12 to an exterior water supply through a hose 15 attachment to the filter housing 12 and out from the water receptacle 7.

In some embodiments, arrow 16 depicts that water can move from an exterior water supply through a hose 5 attachment to the filter housing 12 and out into the water receptacle 7. The exterior water supply can backwash the filter housing 12 and the porous tubes.

Figure 4:
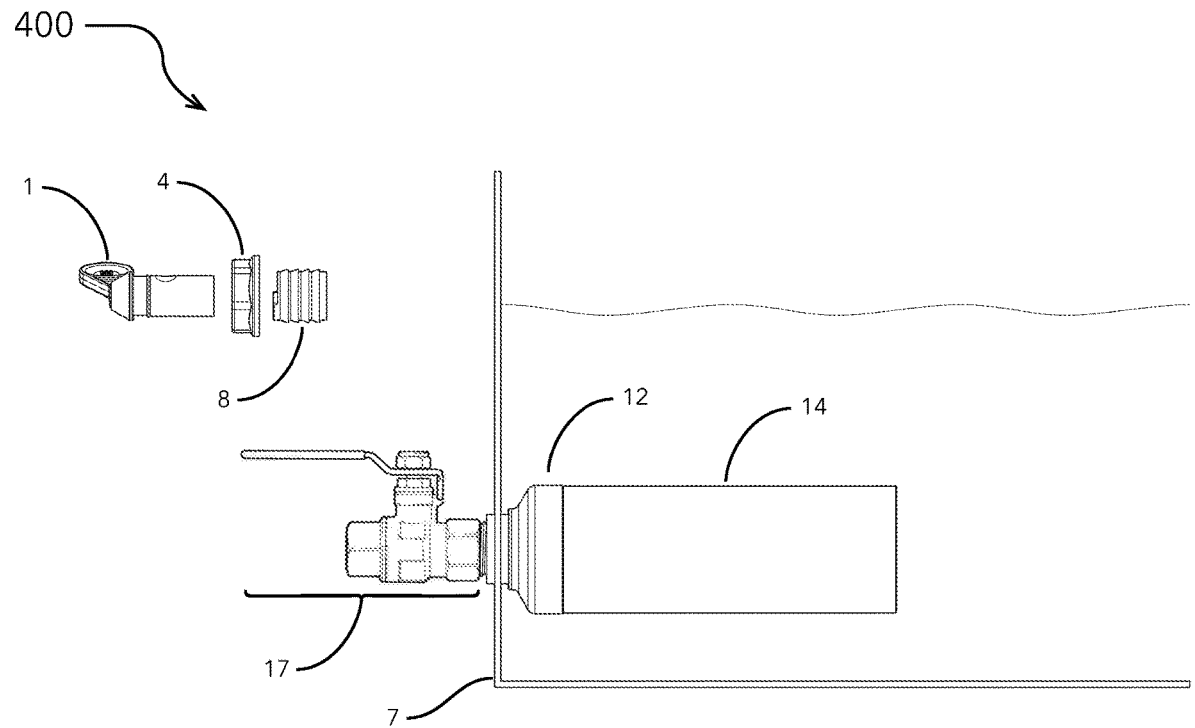
FIG. 4 illustrates a schematic diagram of an example water filtration system in a third embodiment.

FIG. 4 illustrates a schematic diagram of an example water filtration system 400 in a third embodiment. In FIG. 4, the water filtration system 400 is shown with a removable shell 14 encasing the porous tubes (not shown) on the filter housing 12. A ball valve 17 is shown on the exterior surface of the sidewall of the water receptacle and connected to the filter housing 12. The valve component connected to the filter housing may vary (e.g., a valve component with valve arm, spigot, ball valve, etc.).

Figure 5:
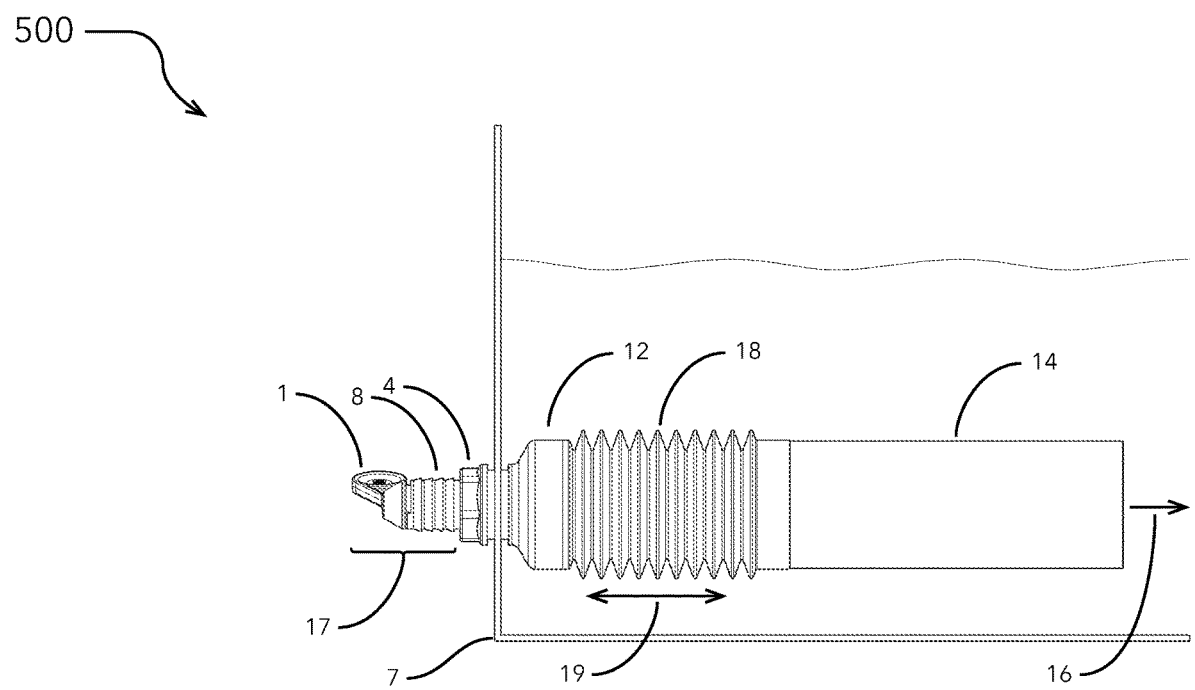
FIG. 5 illustrates a schematic diagram of an example water filtration system in a fourth embodiment.

FIG. 5 illustrates a schematic diagram of an example water filtration system 500 in a fourth embodiment. In FIG. 5, the water filtration system in the first embodiment is shown with a removable shell 7 encasing the porous tubes (not shown) on the filter housing 12. A water level 4 is shown to illustrate the filter housing inside of the water in the water receptacle 7. In this embodiment, a hand pump 8 is shown attached between the filter housing and the valve. The hand pump 18 is configured to move and facilitate washing of the porous tubes. In some implementations, a hand pump, bellows pump, or other pump or apparatus may be used to facilitate movement of the filter housing in the water receptacle to clean the porous tubes.

FIG. 6 illustrates a schematic diagram of an example water filtration system 100 in a fifth embodiment. The water filtration system 600 in FIG. 6 is shown unassembled and includes a filter housing 12 with a removable filter sleeve 14 that is connected to a valve component (e.g. valve component 17 shown in FIGS. 2, 4, and 5) in a water receptacle 7. The water receptacle 7 may be various apparatus. For example, the water receptacle 7 may be a bucket, a can, a drum, a jug, a water bottle, or a larger system or apparatus.

The filter housing 12 and the valve component 17 may be connected to each other with a two washers 5 passing over threads 11, which enter and screw into a filter housing opening 10 to create a seal to the water receptacle 7. Other similar connection components are contemplated. On a second end of the filter housing 12, porous tubes 13 are shown. The porous tubes 13 provide filtration of unfiltered water in the water receptacle 7.

Due to the density of the porous tubes 13, dirt, debris, and organic material collect among the porous tubes 13. The filter sleeve 14 encases and protects the porous tubes 13 from incidental damage and reduces contact with sediment in the water vessel 7. The filter sleeve 14 may slide onto the filter housing 12, or it may attach by other means, such as by a twist, screw on, or bead/female bead attaching means. For example, in FIG. 1, the filter sleeve 14 slides onto the filter housing 12. In FIG. 6, the filter sleeve 14 slides on and then attaches and locks by a second bead 24 and a second female bead 25. As the filter sleeve 14 slides onto the filter housing 12, the porous tubes 13 enter a first sleeve aperture 22 on one end of the filter sleeve 14. A second sleeve aperture 21 is located at the opposite end of the filter sleeve, where water can enter the filter sleeve 14.

In FIG. 6, the filter sleeve 14 is a tubular component with a round first sleeve aperture 22 and a round second sleeve aperture 21. In FIG. 6, the filter sleeve 14 is a tubular component with a round first sleeve aperture 22 at a first end, and a rounded second end, decreasing slightly in diameter with a second aperture 21 shaped according to slots 20 in the filter sleeve 14. The slots 20 provide for more water flow into the filter sleeve 14. In other embodiments, shape of the filter sleeve 14, the apertures, and the slots may vary. In some embodiments, there may be one or more slots.

During cleaning, the filter housing 12 may be disconnected from the valve component 17, the filter sleeve 14 may be removed, and the porous tubes can be swirled around in water or massaged to remove bacteria, dirt, pathogens, etc. In some implementations, the filter housing 12 is not removed, the filter sleeve 14 is removed, and the porous tubes may be massaged or otherwise agitated or rinsed while the filter housing is connected to the valve component 17. In some embodiments, the filter sleeve 14 may be removed and the porous tubes cleaned when the water flow slows down. Depending on the turbidity of the water, the porous tubes may require cleaning more often, such as several times a day. In some embodiments, the porous tubes may only need to be cleaned once a week. In some embodiments, no backwash is required in the water filtration system.

The valve component 17 may include a variety of component parts. For example, as shown in FIG. 6, the valve component 17 includes a valve arm 1, a first bead 3, a first female bead 9, and a valve opening 2, where water can flow in and out. In other implementations, as discussed below, the valve component may include a spigot, a ball valve, or other component. The valve arm 1 in FIG. 6 controls the flow of water in and out of the valve component 17. To reduce space, the valve component 17 is positioned in a vertical alignment adjacent to the water receptacle 7.

The valve component 17 is positioned on an exterior surface of a sidewall of the water receptacle 7, while the filter housing 12 is positioned an interior surface of the sidewall of the water receptacle 7. The connection between the valve component 17 and the filter housing 12 may be positioned on either side of the sidewall, or inside the sidewall of the water receptacle 7. In some embodiments, the connection between the valve component 17 and the filter housing 12 may be positioned in an aperture 6, or outside of the aperture 6.

The valve component 17 and the filter housing 12 may be positioned together in a horizontal axis or a vertical axis, depending on the implementation. The water may be moved by gravity through either the valve component 17 or the filter housing 12, depending on whether the system 100 is being used for water filtration or cleaned by way of backwashing from an exterior water supply to the valve component 17 and through the filter housing 12 and out the porous tubes 13. Other means for moving the water through the water filtration system 100 other than gravity is contemplated. For example, as discussed in FIG. 5, a hand pump may be used to help facilitate water movement during a cleaning process. In another example, there may be a mechanical system attached to the valve component 17 or filter housing 12.

In some embodiments, the water filtration system may be a water bottle or jug. In such instance, the filter housing may be positioned on an interior surface of a lid or an end wall of the water bottle, and the water valve component may be a component located on an exterior surface of the lid or end wall and configured for a user to drink or pour water from the water bottle.

Figure 7:
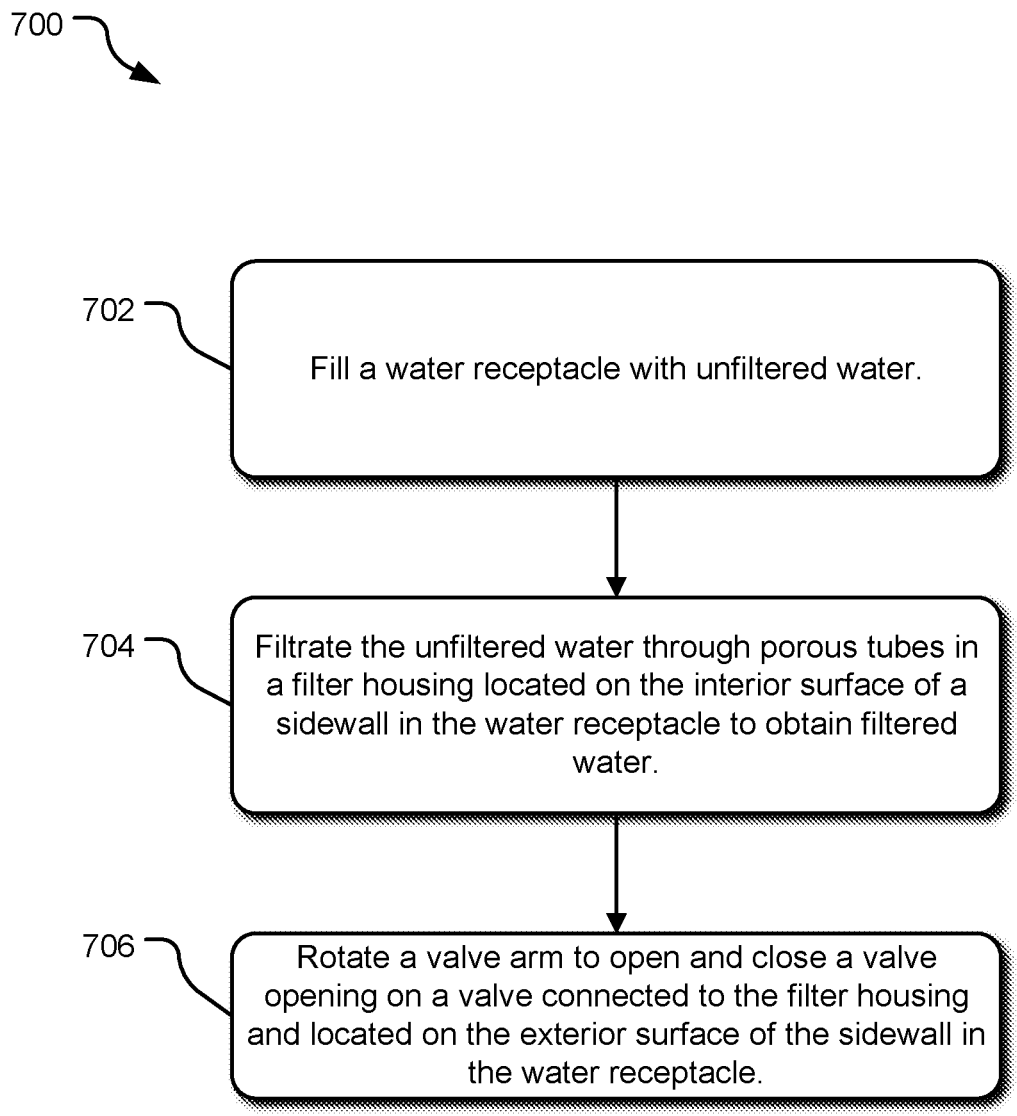
FIG. 7 is a flowchart of example operations for using a water filtration system.

FIG. 7 is a flowchart of example operations 700 for using a water filtration system. An operation 702 fills a water receptacle with unfiltered water. An operation 704 filtrates the unfiltered water through a filter housing in the water receptacle to obtain filtered water. The filter housing is positioned adjacent to an interior surface of a sidewall in the water receptacle. In some embodiments, the filter housing is positioned adjacent to an interior surface of a wall (e.g., a sidewall) in the water receptacle in a horizontal axis (as shown in FIGS. 1 and 6). In some embodiments, the filter housing is positioned adjacent to an interior surface of a wall (e.g., a lid or end wall) in the water receptacle (e.g., a water bottle) in a vertical axis.

An operation 704 moves the filtered water from the filter housing along the horizontal or vertical axis to a valve connected to a first end of a filter housing. The valve positioned adjacent to an exterior surface of the sidewall in the water receptacle in the horizontal or vertical axis. The valve is connected to the filter housing via an aperture located in the sidewall of the water receptacle.

An operation 706 rotates a valve arm to open and close a valve opening on the valve. When the valve opening opens, filtered water can flow out of the valve.

In another operation, a water supply may be attached onto the valve arm, and water may be backwashed through the valve arm, filter housing, and porous tubes. In another operation, water may be backwashed through the valve arm, filter housing, and porous tubes with a water supply connect to the valve. In some implementations, water may be backwashed through the valve arm, filter housing, and porous tubes by compressing the filter housing toward the interior sidewall of the water receptacle with a hand pump positioned between and connecting the valve to the filter housing.

In some implementations of use, the porous tubes may be removed from the second end of the filter housing and the porous tubes may be swirled, or otherwise agitated, to remove contaminants. For example, the filter housing may be detached from the valve component, and the filter housing may be swirled, shaken, or otherwise agitated in water, releasing debris on the porous tubes.

In some implementations of use, a removable sleeve may be connected onto the second end of the filter housing to encase the porous tubes. For example, the sleeve may be used to protect the porous tubes. The removable sleeve may attach to the filter housing during use, allowing water to enter the removable sleeve on one end and pass through the porous tubes to the valve component, converting unfiltered water to filtered water through a valve on the outside of the water receptacle.

In some implementations of use, the removable sleeve is disconnected from the second end of the filter housing to provide access to the porous tubes. In some implementations of use, the porous tubes are cleaned by massaging the porous tubes.

Figure 8:
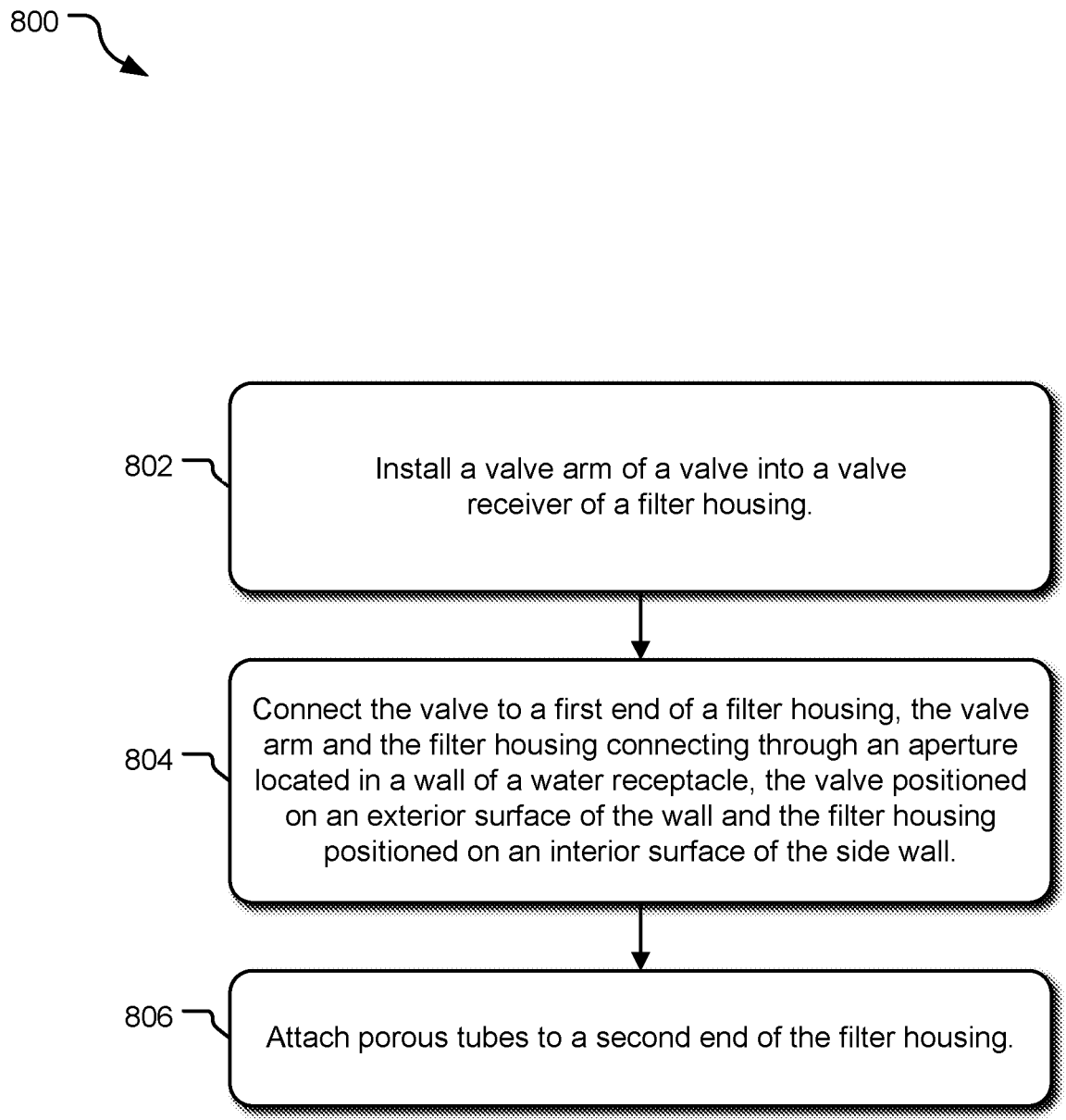
FIG. 8 is a flowchart of example operations for assembling a water filtration system.

FIG. 8 is a flowchart of example operations 800 for assembling a water filtration system. An operation 802 installs a valve arm of a valve into a valve receiver of a filter housing. An operation 804 connects the valve to a first end of a filter housing. The valve arm and the filter housing connect through an aperture located in a wall of a water receptacle. In some embodiments, the valve arm and the filter housing connect in a horizontal axis through an aperture located in a wall (e.g., side wall) of a water receptacle. In some embodiments, the valve arm and the filter housing connect in a vertical axis (e.g., an end wall) through an aperture located in a wall of a water receptacle.

The valve may be positioned on an exterior surface of the side wall and the filter housing is positioned on an interior surface of the side wall. An operation 806 may attach potted porous tubes to a second end of the filter housing.

In some implementations, the method includes adjacently assembling washers and a nut in the water filtration system. The washers and the nut may be configured to pass over the valve arm and the valve receiver of the filter housing and to create a seal. In some implementations, the method includes assembling a first bead in the valve arm to lock directly into the valve receiver of the filter housing to rotate a valve opening to allow water flow. In some implementations, the method includes potting the porous tubes, and encasing the porous tubes in a nylon netting.

The logical operations making up the implementations described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of using a water filtration system comprising:
    filling a water receptacle of the water filtration system with unfiltered water, the water filtration system comprising:
    the water receptacle to house unfiltered water, the water receptacle including an aperture located in a side wall of the water receptacle;
    a receiver comprising a first receiver end and a second receiver end, the first receiver end configured to couple to at least one of a valve, the valve configured to control a water flow from an interior of the water receptacle to an exterior of the water receptacle;
    one or more washers and a nut, the one or more washers and the nut configured to pass over the receiver to create a seal;
    a first bead in the valve configured to lock directly into the receiver and configured to rotate a valve opening to allow water flow;
    a filter housing to filtrate the unfiltered water, the filter housing located on an interior surface of the side wall of the water receptacle, a first housing end of the filter housing connected to the second receiver end and a second housing end of the filter housing connected to porous tubes to collect contaminants, wherein the porous tubes are hollow fibers; and
    a removable filter sleeve removably coupled to the filter housing via one or more threads or beads and configured to removably connect to the filter housing to encase the porous tubes connected to the second housing end of the filter housing and to disconnect from the filter housing to uncover the porous tubes connected to the second housing end of the filter housing and to provide access for cleaning the porous tubes connected to the second housing end of the filter housing;
    filtrating the unfiltered water through the porous tubes encased in the removable filter sleeve in the filter housing in the water receptacle; and
    moving filtered water from the filter housing to the valve, the valve being positioned adjacent to an exterior surface of the wall in the water receptacle, the valve connected to the first receiver end.

2. The method of claim 1, further comprising: rotating the first bead to open and close the valve opening on the valve.

3. The method of claim 1, further comprising: disconnecting the removable filter sleeve from the second housing end of the filter housing to provide access to the porous tubes.

4. The method of claim 1, further comprising: disconnecting the filter housing from the water receptacle; and cleaning the porous tubes.

5. The method of claim 4, further comprising:
cleaning the porous tubes by rinsing the porous tubes.

6. The method of claim 5, further comprising:
cleaning the porous tubes by rinsing the porous tubes in unfiltered water.

7. The method of claim 4, further comprising:
removing contaminants from the porous tubes.

8. The method of claim 1, wherein the valve is positioned adjacent to an exterior surface of the sidewall in the water receptacle in a horizontal axis.

9. The method of claim 1, wherein the valve is positioned adjacent to an exterior surface of the sidewall in the water receptacle in a vertical axis.

10. The method of claim 1, further comprising: attaching a water supply onto the valve; and backwashing water through the valve, filter housing, and the porous tubes with the water supply connected to the valve.

11. A water filtration system comprising:
a water receptacle to house unfiltered water, the water receptacle including an aperture located in a side wall of the water receptacle;
a receiver comprising a first receiver end and a second receiver end, the first receiver end configured to couple to at least one of a valve, the valve configured to control a water flow from an interior of the water receptacle to an exterior of the water receptacle;
one or more washers and a nut, the one or more washers and the nut configured to pass over the receiver to create a seal;
a first bead in the valve configured to lock directly into the receiver and configured to rotate a valve opening to allow water flow;
a filter housing to filtrate the unfiltered water, the filter housing located on an interior surface of the sidewall of the water receptacle, a first housing end of the filter housing connected to the second receiver end, and a second housing end of the filter housing connected to porous tubes to collect contaminants, wherein the porous tubes are hollow fibers; and
a removable filter sleeve removably coupled to the filter housing via one or more threads or beads and configured to removably connect to the filter housing to encase the porous tubes connected to the second housing end of the filter housing and to disconnect from the filter housing to uncover the porous tubes connected to the second housing end of the filter housing and to provide access for cleaning the porous tubes connected to the second housing end of the filter housing.

12. The water filtration system of claim 11, wherein the porous tubes are encased by nylon netting.

13. The water filtration system of claim 11, wherein the porous tubes are cleaned by agitation.

14. The water filtration system of claim 11, wherein the porous tubes are cleaned in unfiltered water.

15. The water filtration system of claim 11, wherein the receiver is configured to extend through the aperture located in the sidewall of the water receptacle, and wherein the receiver is configured to removably couple the at least one of the valve or the hose located on an exterior surface of the sidewall of the water receptacle to the filter housing located on the interior surface of the sidewall of the water receptacle.

16. The water filtration system of claim 15, wherein the aperture located in the sidewall of the water receptacle is smaller than the filter housing.

17. The water filtration system of claim 15, wherein the water filtration system comprises the valve of the at least one of the valve or the hose, and wherein the filter housing is removably coupled to the valve and the filter housing is independently removable from the water receptacle without removing the valve.

* * * * *